P. EAGLE.
FASTENER.
APPLICATION FILED APR. 24, 1914.
1,119,073.
Patented Dec. 1, 1914.
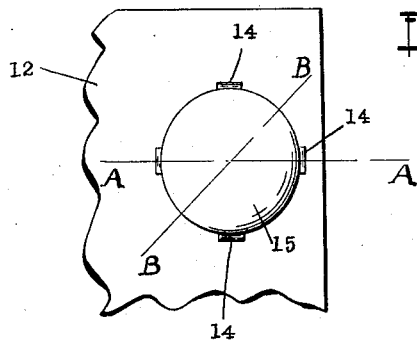
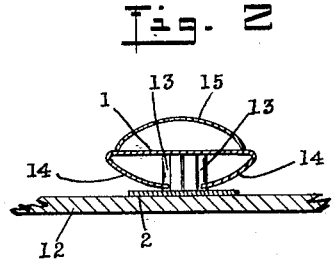
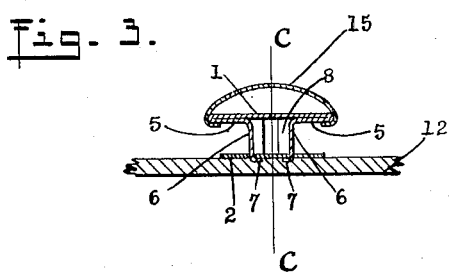
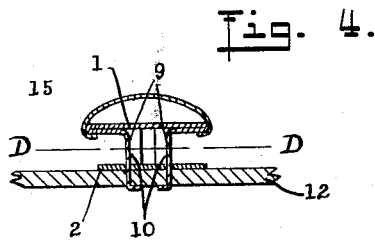
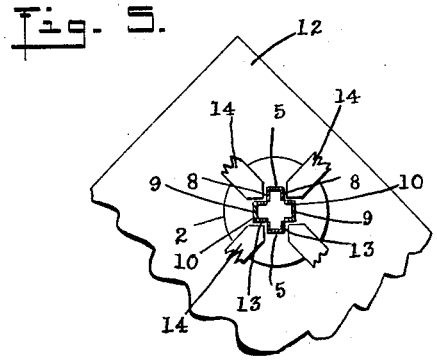
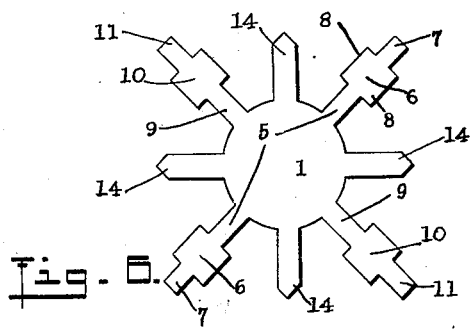
WITNESSES:
Howard P. King.
Janet A. Ayers.
INVENTOR:
Peter Eagle,
BY Russell M. Everett,
ATTORNEY.

UNITED STATES PATENT OFFICE.

PETER EAGLE, OF WORCESTER, MASSACHUSETTS.

FASTENER.

1,119,073.  Specification of Letters Patent. Patented Dec. 1, 1914.

Application filed April 24, 1914. Serial No. 834,038.

*To all whom it may concern:*

Be it known that I, PETER EAGLE, a subject of the Czar of Russia, residing at Worcester, in the county of Worcester and State of Massachusetts, have invented certain Improvements in Fasteners, of which the following is a specification.

This invention relates more particularly to fasteners for securing the ends of shoe strings and other lacing cords, and has for its objects to provide a device of this character which will be neat, efficient and durable; to provide springs for frictionally holding the lace or cord close to the surface to which the device is applied; to guide said springs at their free ends to prevent lateral displacement thereof; to provide a structure readily stamped from sheet metal; to secure simplicity of construction and operation, and to obtain other advantages and results as may be brought out in the following description.

Referring to the accompanying drawings, in which like numerals of reference indicate the same parts throughout the several views, Figure 1 is a plan of a fastener embodying my invention mounted in operative position; Fig. 2 is a transverse section thereof on line A—A; Fig. 3 is a similar section on line B—B of Fig. 1; Fig. 4 is a similar section on line C—C of Fig. 3; Fig. 5 is a sectional plan view on line D—D of Fig. 4, and Fig. 6 is a plan of the body portion of the device unfolded.

In the specific embodiment of the invention illustrated in said drawings, the reference numeral 1 indicates a plate or head preferably of sheet metal and disk-shaped. Spaced from and parallel to said head is a base plate 2, means being provided for holding said base plate and head in fixed relation to each other, said means being here shown as comprising a pair of arms 5, 5 formed integrally with the head at diametrically opposite points and bent at the edge of the head radially inward under said head to lie flatwise against the same. At a distance from the edge of the head, the arms are bent transversely thereto, as at 6, toward the base plate 2, and an end lip 7 on each of said arms projects through and is bent under the base plate. For preventing the base plate from moving toward the head, said arms are constructed wider for the transverse portion 6 between the lip and the opposite end by forming said transverse portion with wings 8, 8 upon opposite sides of each of said arms. Said wings preferably are turned perpendicularly inward toward the center of the device thus forming the transverse portion into channel shape. Midway of the periphery of the head between said arms 5, 5 I provide another pair of arms 9, 9 of similar construction to the arms 5, 5 above described having channel portions 10, 10 transverse to the head but having lips or outer extremities 11, 11 which will not only pass through the base plate 2 but are adapted to project through the material of the shoe or other article 12 and be then turned over flatwise of the material to clench the device to such article. In the construction of the device it is preferable to space the transverse portions of the arms from each other in such a manner that the inner or free edge of each wing is adjacent the inner edge of the nearest wing of the adjacent arm, and thus in cross section the several channel members form a cross, each adjacent pair of wings forming an exterior channel or guideway 13.

Leaf springs 14 preferably integral with the head or plate 1, are disposed at intervals around the periphery of said head, here shown as midway between adjacent arms 5, 9 said springs being bent radially inward and curving convexly downward toward the base plate 2, the free ends extending into the guideways 13. Said springs may move resiliently toward and away from the base plate but are not readily displaced laterally.

In operation the device is mounted in position by inserting the lips or outer extremities 11, 11 through the material of the shoe or other article 12 and clamping the same in place. Preferably, when used with a shoe, for example, one of my improved fasteners is secured to each of the flaps of the shoe near their upper and adjacent edges, in place of the usual upper eyelet or the like. The shoe is then laced as usual through the remaining eyelets and each string twisted one or more times around its respective fastener. In so twisting the string around the fastener the leaf springs 14 are forced upward toward the head 1 and the resiliency of said springs bearing upon the string will clamp the string against the base plate.

In the drawings I have shown a dome-like cap 15 secured upon the outer side of the head 1, but I do not restrict myself to any particular kind nor shape of cap as the same is for ornamental purposes and may be varied at will or omitted entirely without departing from the spirit or scope of my invention as set forth in the appended claims when construed in the light of the prior art.

Having thus described the invention what I claim is,—

1. In a fastener, a base plate, and a head plate substantially parallel to said base plate having arms integral therewith about its periphery, all said arms being directed between said head plate and base plate and arranged around the entire periphery alternately as spacing members for said head and base plates and as springs adapted to press a string or the like toward the base plate, thereby gripping the same.

2. In a fastener, a head plate having leaf springs extending radially inward, means spaced from the periphery of said head plate for spacing said head plate from an article, and having guideways into which the ends of said springs may project thereby preventing lateral displacement of said springs.

3. In a fastener, a head plate having arms with portions extending transversely of said head plate at a distance from the periphery thereof, a base plate separated from the head plate by said transverse portions of the arms, said head plate having leaf springs extending radially inward and convexly curved toward the base plate, and said transverse portions of the arms providing guideways adapted to receive the ends of said springs and prevent lateral displacement thereof.

PETER EAGLE.

Witnesses:
JOSEPH G. MARTIN,
THOMAS L. BROWN.

Copies of this patent may be obtained for five cents each, by addressing the "Commissioner of Patents, Washington, D. C."